United States Patent
Takashima

(10) Patent No.: US 8,670,134 B2
(45) Date of Patent: Mar. 11, 2014

(54) PRINT CONTROL APPARATUS, PRINT CONTROL METHOD, AND STORAGE MEDIUM

(75) Inventor: Keiichi Takashima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 292 days.

(21) Appl. No.: 13/292,505

(22) Filed: Nov. 9, 2011

(65) Prior Publication Data

US 2012/0127499 A1    May 24, 2012

(30) Foreign Application Priority Data

Nov. 19, 2010  (JP) ................................. 2010-259409

(51) Int. Cl.
- *G06F 3/12* (2006.01)
- *G06K 15/00* (2006.01)
- *H04N 1/46* (2006.01)
- *G06F 17/00* (2006.01)
- *G06F 17/24* (2006.01)

(52) U.S. Cl.
USPC ......... 358/1.13; 358/1.14; 358/524; 715/200; 715/234; 715/274; 715/276

(58) Field of Classification Search
None
See application file for complete search history.

(56) References Cited

U.S. PATENT DOCUMENTS

2007/0091343 A1* 4/2007 Morita .......................... 358/1.13
2011/0273740 A1* 11/2011 Yang et al. ................... 358/1.15

FOREIGN PATENT DOCUMENTS

JP    2007-013799 A    1/2007

* cited by examiner

*Primary Examiner* — Thomas Lett
(74) *Attorney, Agent, or Firm* — Canon USA, Inc., IP Division

(57) ABSTRACT

A print control apparatus may include a determination unit, a division unit, and a rearrangement unit to process print data impositioned by an application program. The determination unit determines whether at least one of an impositioned appearance indicating an arrangement of logical pages in respective physical pages of the impositioned print data, and a print output attribute, which is an attribute of an output of the impositioned print data, satisfies a division condition set in advance. If the determining unit determines that the impositioned appearance or the print output attribute satisfies the division condition, the division unit divides the impositioned print data in logical-page unit. The rearrangement unit rearranges divided logical pages in an order according to the impositioned appearance. If neither the impositioned appearance nor the print output attribute satisfies the division condition, the impositioned print data is prevented from being divided in logical-page unit.

9 Claims, 16 Drawing Sheets

FIG.4
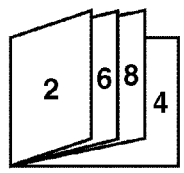
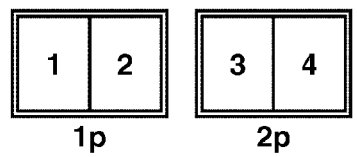  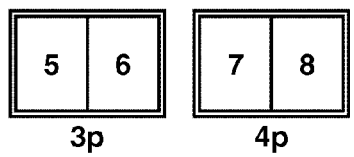
⬇ BOOKBINDING IMPOSITION
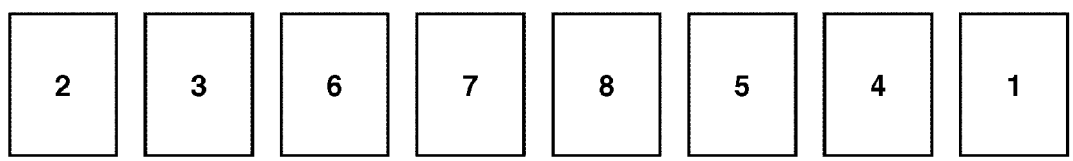

FIG.5
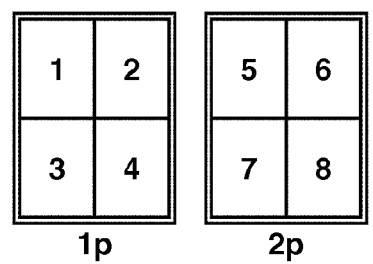
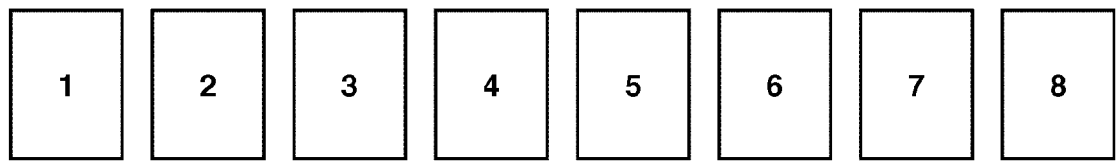

FIG.10
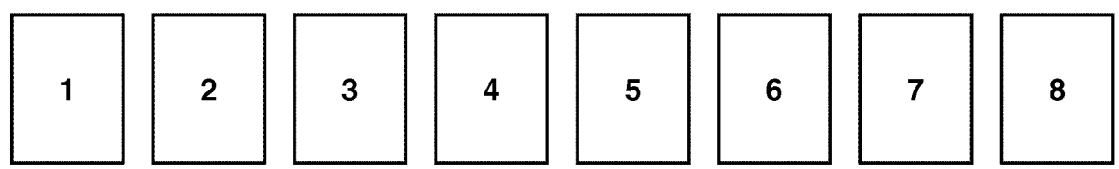
⬇ BOOKBINDING IMPOSITION
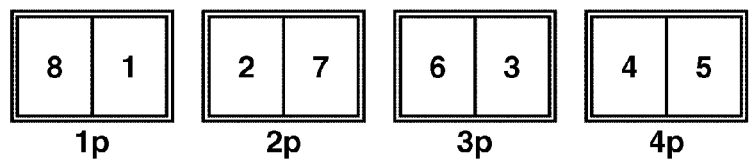
⬇ TWO-SIDED PRINTING + CENTER BINDING + TWOFOLD
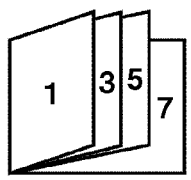

FIG.12

PRINT CONTROL APPARATUS, PRINT CONTROL METHOD, AND STORAGE MEDIUM

BACKGROUND OF THE INVENTION

1. Field of the Invention

The present invention relates to a print control system, a print control method, and a computer-readable storage medium, and more particularly, to those which are suitable for use in printing print data which has been impositioned by an application program.

2. Description of the Related Art

Conventionally, in a case where a print product such as a small booklet or a catalog is created in a simplified manner using a printer, two-sided printing is performed by generating document data which has been subjected to bookbinding imposition in advance. Then, the print product is folded in two by stapling (performing saddle stitching) in the middle of the print product by hand. The bookbinding imposition means to perform imposition so that pages of a document can be seen in a correct order in a twofold state.

Nowadays, product manuals or catalogs can be downloaded from manufacturer's web sites as Portable Document Format (PDF) data. Also, bookbinding impositioned data can be seen, as such PDF data.

On the other hand, multi-functional peripheral devices capable of performing not only printing of documents but also stapling have become common. Also, multi-functional peripheral devices capable of performing saddle-stitching or twofold as post-processing of printing are becoming more and more popular.

In printer drivers, a function of N-up imposition for performing imposition of images for N pages on a surface of one page has been included, and now a function of bookbinding imposition is included.

By performing printing after having set the function of bookbinding imposition by print settings of the printer driver, bookbinding impositioned printing can be performed by using the printer driver even on document data not-yet-bookbinding-impositioned. Furthermore, the document can be easily bound into a book by using the function of multi-functional peripheral device.

However, in a case where N-up impositioned document data or bookbinding impositioned document data is printed by using the printer driver, the printer driver recognizes only impositioned physical pages. For this reason, there has been a problem that printing or preview based on logical pages cannot be performed.

Further, various different functions of the printer driver may not be usable, or printing in a desirable form may not be able to be carried out in some cases. For example, when a function of adding page numbers is used, page numbers are added to physical pages instead of logical pages. In particular, when page numbers are added to the bookbinding impositioned document data, page numbers may become meaningless numbers, or rendering position of the page numbers may lie on a folding line, resulting in being useless.

Thus, Japanese Patent Application Laid-Open No. 2007-13799 discusses a technique for acquiring images of logical pages in accordance with imposition appearance from image data obtained by scanning paper sheets, and creating document file bound in the order of the logical pages.

However, in the technique discussed in Japanese Patent Application Laid-Open No. 2007-13799, there is a problem that when imposition appearance of input data is designated, the input data is always divided in logical-page unit.

The printer driver itself has the functions of the bookbinding imposition and the N-up imposition, and thus the input data can be used as it is without dividing it in logical-page unit, depending on print settings of the output data. If the print data is divided in logical-page unit in a case where the input data can be used as it is, not only processing speed becomes slow, but also size of output data becomes large.

SUMMARY OF THE INVENTION

The present invention is directed to a print control apparatus, and a print control method capable of appropriately performing printing of impositioned print data by using a printer driver.

According to an aspect of the present invention, a print control apparatus for processing print data impositioned by an application program by using a printer driver includes a determination unit configured to determine whether at least anyone of an impositioned appearance indicating an arrangement of logical pages in respective physical pages of the impositioned print data, and a print output attribute, which is an attribute of an output of the impositioned print data, satisfies a division condition set in advance, a division unit configured to, in response to the determining unit determining that at least any one of the impositioned appearance and the print output attribute satisfies the division condition, divide the impositioned print data in logical-page unit, and a rearrangement unit configured to rearrange logical pages divided by the division unit in an order according to the impositioned appearance, wherein, in response to the determination unit determining that neither of the impositioned appearance and the print output attribute satisfies the division condition, the impositioned print data is prevented from being divided in logical-page unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a diagram illustrating rearrangement of logical pages in a case of bookbinding imposition with left side binding.

FIG. 5 is a diagram illustrating rearrangement of logical pages in case of right direction arrangement in 4-up imposition.

FIG. 10 is a diagram illustrating an imposition method in a case of bookbinding with left side binding.

FIG. 12 illustrates a preview screen.

DESCRIPTION OF THE EMBODIMENTS

Various exemplary embodiments, features, and aspects of the invention will be described in detail below with reference to the drawings.

Figure 1:
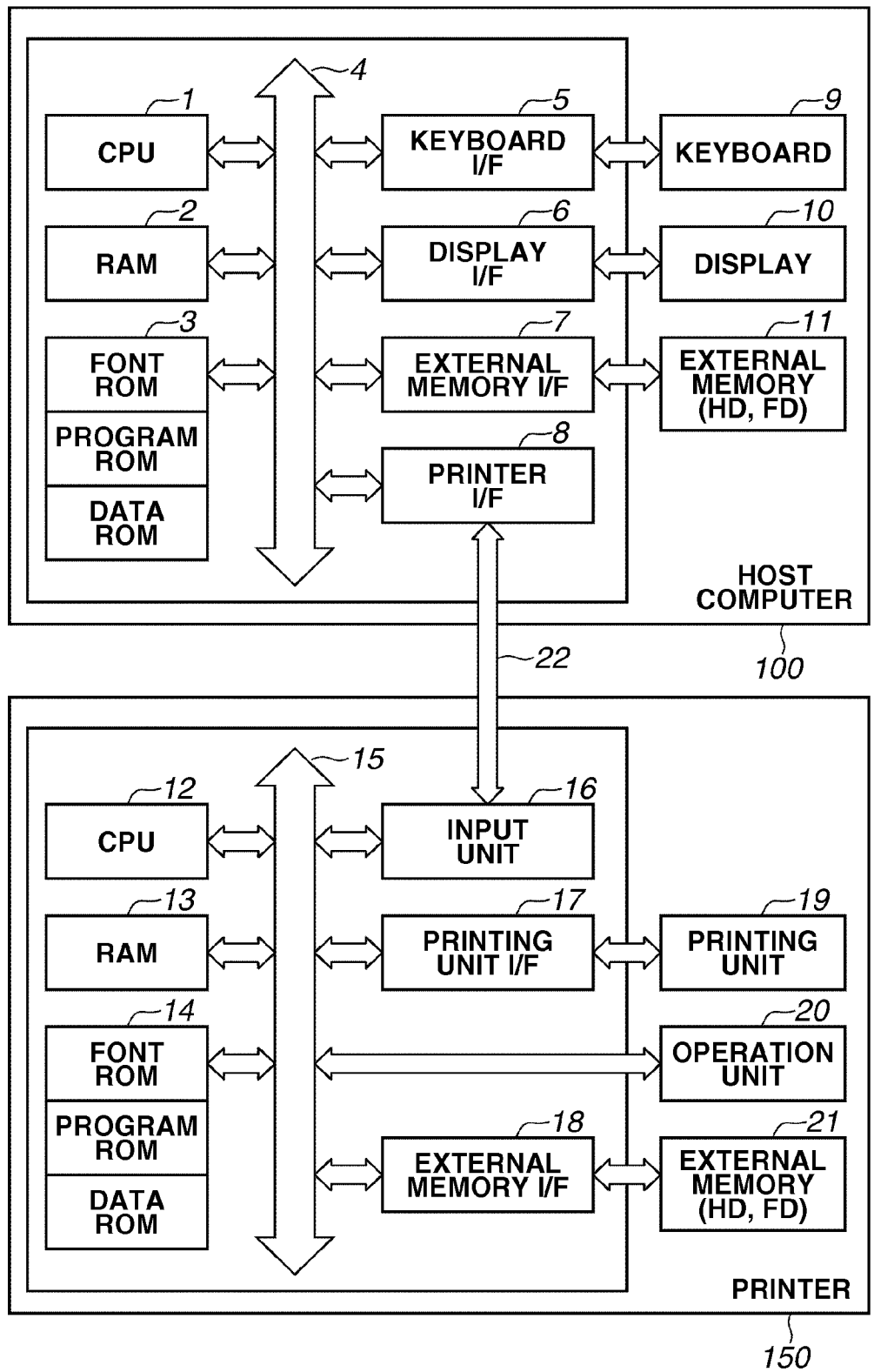
FIG. 1 is a block diagram illustrating a configuration of a print control system.

First, an image forming system to which an exemplary embodiment can be applied will be described. FIG. 1 is a block diagram illustrating a configuration of an example of a print control system in which an information processing apparatus which perform print control and an image forming apparatus can communicate with each other. In the present exemplary embodiment, descriptions will be given by taking, as an example, a case of using an XML Paper Specification (XPS) printing system of Microsoft Corporation's Windows (trademark) as an operating system (hereinafter, referred to as an OS).

It is needless to say that embodiments of the present invention can be applied to a device regardless of a configuration of the device, as long as it can execute the functions of the present invention, unless otherwise specified. The image forming system may be a system composed of single device, a system composed of a plurality of devices, or a system in which connection is established via a network such as a local area network (LAN), or a wide area network (WAN), and processing is performed.

In FIG. 1, a host computer 100 includes a central processing unit (CPU) 1 that executes document processing in which figures, images, characters, tables (including a spreadsheet), and the like are mixed, based on a document processing program or the like stored in a read-only memory (ROM) for program in a ROM 3 or an external memory 11.

Furthermore, the CPU 1 collectively controls respective devices connected to a system bus 4. Further, the program ROM in the ROM 3 or the external memory 11 stores the OS or the like serving as a control program of the CPU 1. In the present exemplary embodiment, as described above, descriptions will be given by taking, as an example, the case where OS is the Microsoft's Windows (trademark).

A font ROM in the ROM 3 or the external memory 11 stores font data used when executing document processing. A data ROM in the ROM 3 or the external memory 11 stores various types of data used when executing document processing.

A random-access memory (RAM) 2 works as a main memory, a work area, and the like of the CPU 1. A keyboard I/F 5 controls key input from a keyboard 9 and a pointing device (not illustrated).

A display I/F 6 controls display of a display 10. An external memory I/F 7 controls access to the external memory 11 such as a hard disk (HD), a flexible disk (FD), and the like. The external memory 11 stores a boot program, various types of application programs (hereinafter, referred to as applications), font data, a user file, and an edit file, and a printer driver.

A printer I/F 8 is used to connect a printer 150 to the host computer 100 via a bi-directional interface 22, and executes communication control processing with the printer 150. The CPU 1 executes rasterizing processing of an outline font into display information-RAM which has been set in, for example, the RAM 2, and allows "What You can See is What You Get" (WYSIWYG) on the display 10.

Further, the CPU 1 opens various windows registered according to a command designated using the mouse cursor (not illustrated) to be displayed on the display 10, and executes various data processing.

The user, when information generated by the application is printed, performs an operation for opening on the display 10 a user interface for setting the information. Then, the user performs setting of the printer 150, and selection of print mode. At this time, the user can perform settings of various print processing methods, via the user interface which the printer driver provides.

In the printer 150, a printer CPU (CPU) 12 outputs image signals as output information to a printing unit (printer engine) 19 via a printing unit I/F 17, based on a control program or the like stored in a program ROM in a ROM 14 or an external memory 21. The program ROM in the ROM 14 stores a control program or the like of the CPU 12. A font ROM in the ROM 14 stores font data or the like to be used upon generating the output information.

If the printer 150 is a printer that has no external memory 21 such as a hard disk (HD), a flexible disk (FD), an IC card, or the like, then information utilized on the host computer 100 is stored in a data ROM in the ROM 14.

The CPU 12 can perform bidirectional communication processing with the host computer 100 via an input unit 16, and can notify the host computer 100 of information in the printer 150. In this case, the information within the printer 150 includes the status of the printing unit (the printer engine) 19, network setting information, device names, resource names.

A random-access memory (RAM) 13 works as a main memory, a work area, and the like of the CPU 12. The printer 150 is configured so that a memory capacity thereof can be expanded by adding optional RAMs connected to extension ports (not illustrated).

The RAM 13 is used for output information rasterization region, environment data storage region, non-volatile RAM (NVRAM). An access to the external memory 21 is controlled by an external memory I/F 18. The external memory 21 is connected to a printer 150 as an option, and stores font the data, emulation program, and so on.

Figure 2:
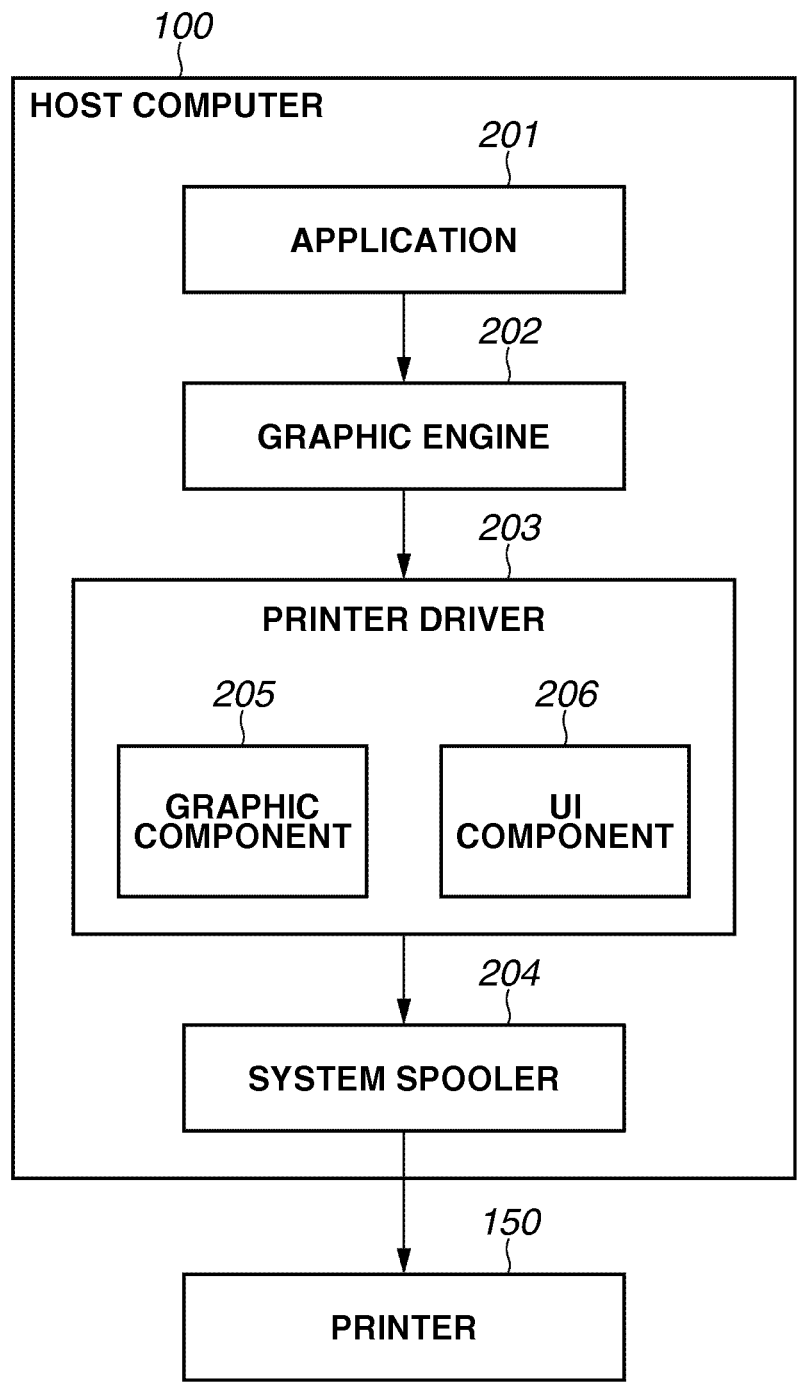
FIG. 2 is a block diagram illustrating a configuration for print processing in a host computer.

FIG. 2 illustrates an example of a configuration for print processing in the host computer 100 illustrated in FIG. 1. An application 201, a graphic engine 202, a printer driver 203, and a system spooler 204 exist as files saved in the external memory 1. These are program modules which are loaded onto the RAM 2 by the OS or a module that uses the corresponding module and are executed.

Further, the application 201 and the printer driver 203 can be saved in the external memory 11 or a portable type storage medium such as a compact disk ROM (CD-ROM) (not illustrated), or a storage medium such as a HD connected to the host computer 100 by way of a network (not illustrated).

Then, the application 201 saved in the external memory 11 is loaded onto the RAM 2 and executed. When this application 201 executes printing with respect to the printer 150, it uses the graphic engine 202, which is loaded onto the RAM 2 similar to the application 201 and is executable.

The graphic engine 202 loads the printer driver 203 which is prepared for each printing apparatus such as the printer 150 from the external memory 11 onto the RAM 2, and sets the output from the application 201 in the printer driver 203.

Further, the graphic engine 202 receives print setting or data from the application 201, and outputs it as the print data to the printer driver 203.

A graphic component 205 of the printer driver 203 receives the print data from the graphic engine 202. Then, the graphic component 205 converts the received print data into a printer control command, e.g., Page Description Language (PDL) that the printer 150 can recognize.

The printer control command is configured so that it is output as a print job to the printer 150 via the interface 22 through the system spooler 204 which is loaded onto the RAM 2 by the OS.

A user interface (UI) component 206 of the printer driver 203 receives print settings from the graphic engine 202, performs display, change, and the like of the print settings, and returns them to the application 201 through the graphic engine 202.

In the XPS printing system, the printer driver 203 receives XPS data as the print data. The XPS data is in an XML-based data format which can be also used as the document data. The document structure adopts three layered hierarchical tree structure, consisting of "Fixed Document Sequence (hereinafter, referred to as FDS)", "Fixed Document (hereinafter, referred to as FD)", and "Fixed Page (hereinafter, referred to as FP)".

FDS represents a job, FD represents a document, and FP represents a page. The FP is further composed of a plurality of rendering objects.

In the XPS data, there are three types of rendering objects, such as Path (graphics), Glyphs (characters), and Canvas (groups). The Canvas is used as a parent object for logically bringing together a plurality of rendering objects, or referring to resources described below. The rendering object has a plurality of attributes corresponding to respective rendering types.

In the attribute, both an attribute which affects rendering, and an attribute which does not affect rendering, are included, and there is an attribute which is not essential. Reference to resources is also realized by the attribute.

Images, fonts, and thumbnails are resources, and it is possible to refer to one resource from a plurality of rendering objects. Furthermore, it is possible to bring the plurality of rendering objects together to define it as one Resource Dictionary.

It is possible to share rendering objects by referring to Resource Dictionary from Fixed Page or Canvas. It is possible to define the plurality of Resource Dictionaries. Further, it is possible to define rendering brush or the like other than rendering objects in the Resource Dictionary.

Further, the XPS data can have therein print settings of Print Ticket (hereinafter, referred to as a PT). In DEVMODE, which is print setting of graphic device interface (GDI) printing system, all attributes are set at one time, and the entire DEVMODE is changed over in the middle of a job if needed. In contrast, in the PT, only some print settings can be designated in job-document-page unit.

Figure 3:
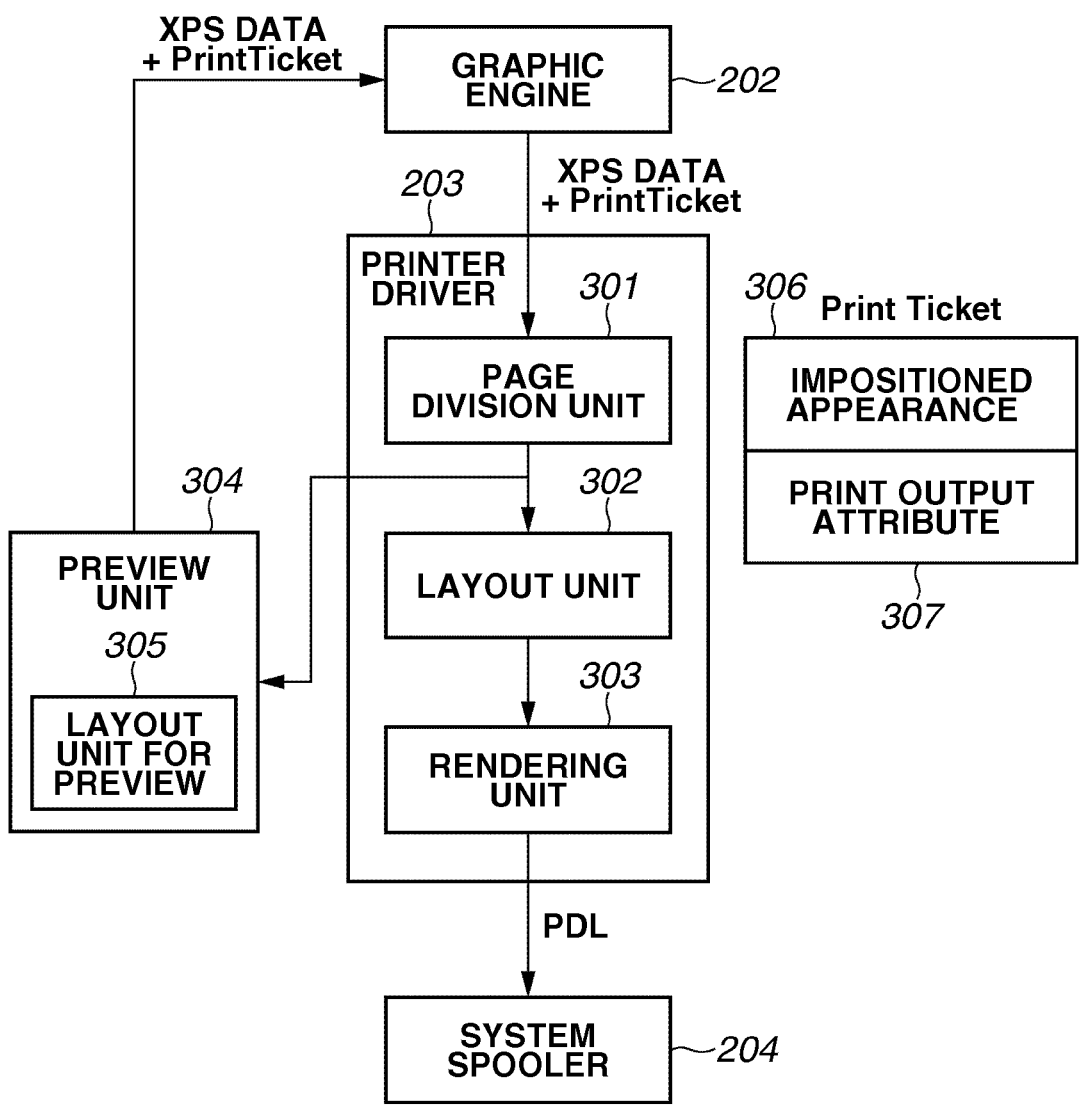
FIG. 3 is a block diagram illustrating a functional configuration of a printer driver.

FIG. 3 illustrates an example of a functional configuration of the printer driver 203 in the image forming system according to the present exemplary embodiment.

The page division unit 301 receives XPS data, which is the print data, from the graphic engine 202, and if needed, divides pages of the XPS data in logical-page unit, and rearranges them in the order of the logical pages. Hereinbelow, impositioned page by the application 201 is referred to as a physical page, and page impositioned on the physical page is referred to as a logical page, and N-th page is referred to as a page N (N is positive integers).

FIG. 4 is a diagram illustrating an example of rearrangement of the logical pages, in a case where the impositioned appearance is bookbinding imposition with left side binding. In the case of the bookbinding imposition, there are physical pages in even number on which two logical pages are impositioned, and the logical pages are impositioned on the physical pages so that when these physical pages are subjected to two-sided printing and folded in two, the logical pages become a correct order.

For example, in the case of bookbinding imposition with left side binding of 4-physical pages, illustrated in FIG. 4, left side logical page and right side logical page on the first physical page (1p) are a logical 8 (the last logical page) and a logical 1 (the first logical page), respectively. The page division unit 301 divides the physical page into halves, and rearranges the order as illustrated in a lower side in FIG. 4.

FIG. 5 is a diagram illustrating an example of rearrangement of logical pages in a case where impositioned appearance is 4-up imposition and right side direction arrangement. The page division unit 301 divides the physical pages into four parts, and rearranges the logical pages as illustrated in a lower stage in FIG. 5.

The UI component 206 sets how the print data is impositioned as impositioned appearance so that the page division unit 301 divides the physical pages in logical-page unit, and recognizes the order of the logical pages. The setting of the impositioned appearance is included in the PT associated with the XPS data as the impositioned appearance 306.

Figure 6:
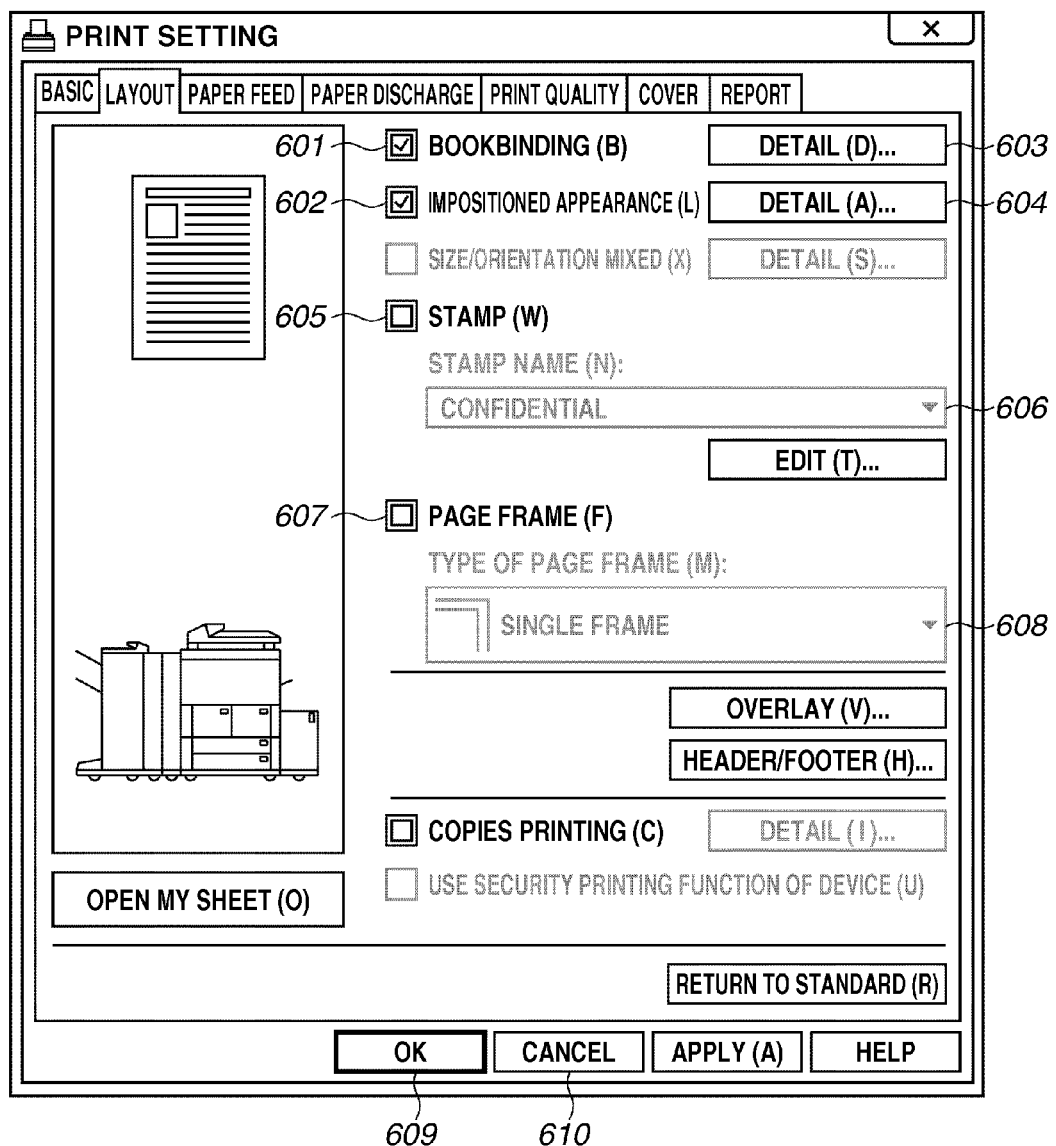
FIG. 6 illustrates a layout-related print setting screen.

FIG. 6 illustrates an example of layout-related print setting screen of the printer driver 203. A check box 602 of the impositioned appearance is turned on using this print setting screen 600, and a detail button 604 becomes valid. When the detail button 604 is pressed, an impositioned appearance setting screen is opened.

Figure 7:
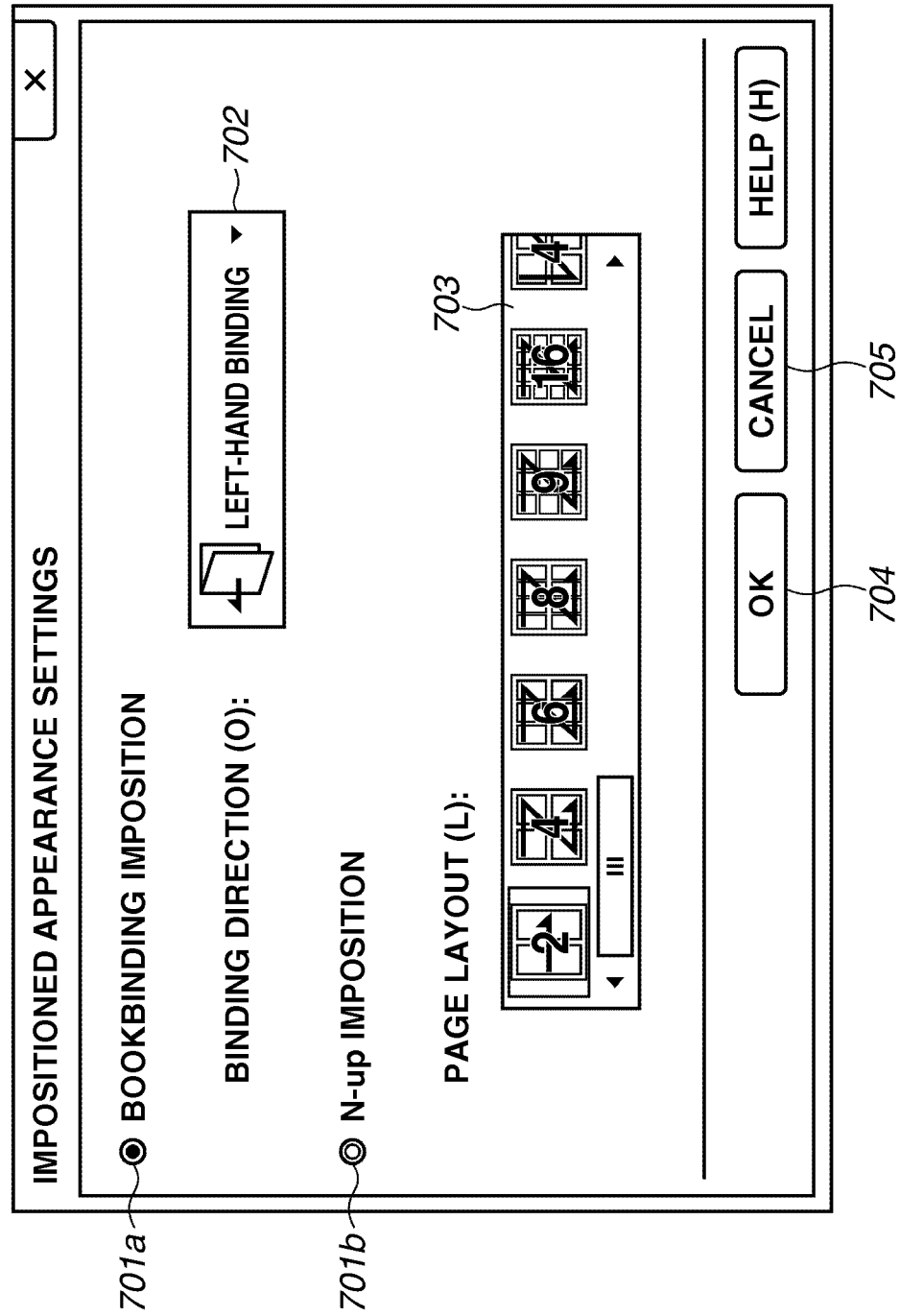
FIG. 7 illustrates an impositioned appearance setting screen.

FIG. 7 illustrates an example of the impositioned appearance setting screen. If the user designates the bookbinding imposition as an appearance of the imposition, and selects a radio button 701a using the impositioned appearance setting screen 700a. If the user designates N-up imposition, the user selects a radio button 701b.

Furthermore, when designating bookbinding imposition, the user selects whether left side binding or right side binding using a pull-down menu 702 for binding direction. When designating N-up imposition, the user selects a number of logical pages impositioned on one physical page, and imposition order of the logical pages, using the page layout selection pane 703.

For example, in the case of 4-up right side direction arrangement, the user selects a second icon from left side of a page layout selection pane 703. In an impositioned appearance setting screen 700, when an OK button 704 is pressed by the user, the page division unit 301 defines the setting performed for the impositioned appearance setting screen 700 and closes the impositioned appearance setting screen 700.

A cancel button 705 is pressed by the user, and the page division unit 301 makes the setting performed for the impositioned appearance setting screen 700 invalid, and closes the impositioned appearance setting screen 700.

When designating non-imposition (1in1), the user turns off the check box 602 of the impositioned appearance of the print setting screen 600. In the print setting screen 600, when an OK button 609 is pressed by the user, the page division unit 301 defines the setting performed for the print setting screen 600 and closes the print setting screen 600.

When a cancel button 610 is pressed by the user, the page division unit 301 makes the setting performed for the print setting screen 600 invalid and closes the print setting screen 600.

A layout unit 302 processes XPS data in accordance with the print output attribute 307, to imposition the logical pages, and adds rendering of watermark. The UI component 206 sets how to process the print data as the print output attribute.

Settings of the print output attribute are included in the PT associated with the XPS data as the print output attribute 307. When the user turns on a check box 601 of the bookbinding on the layout-related print setting screen 600 illustrated in FIG. 6, a detail button 603 becomes valid. When the user presses the detail button 603, the bookbinding setting screen is opened.

Figure 9:
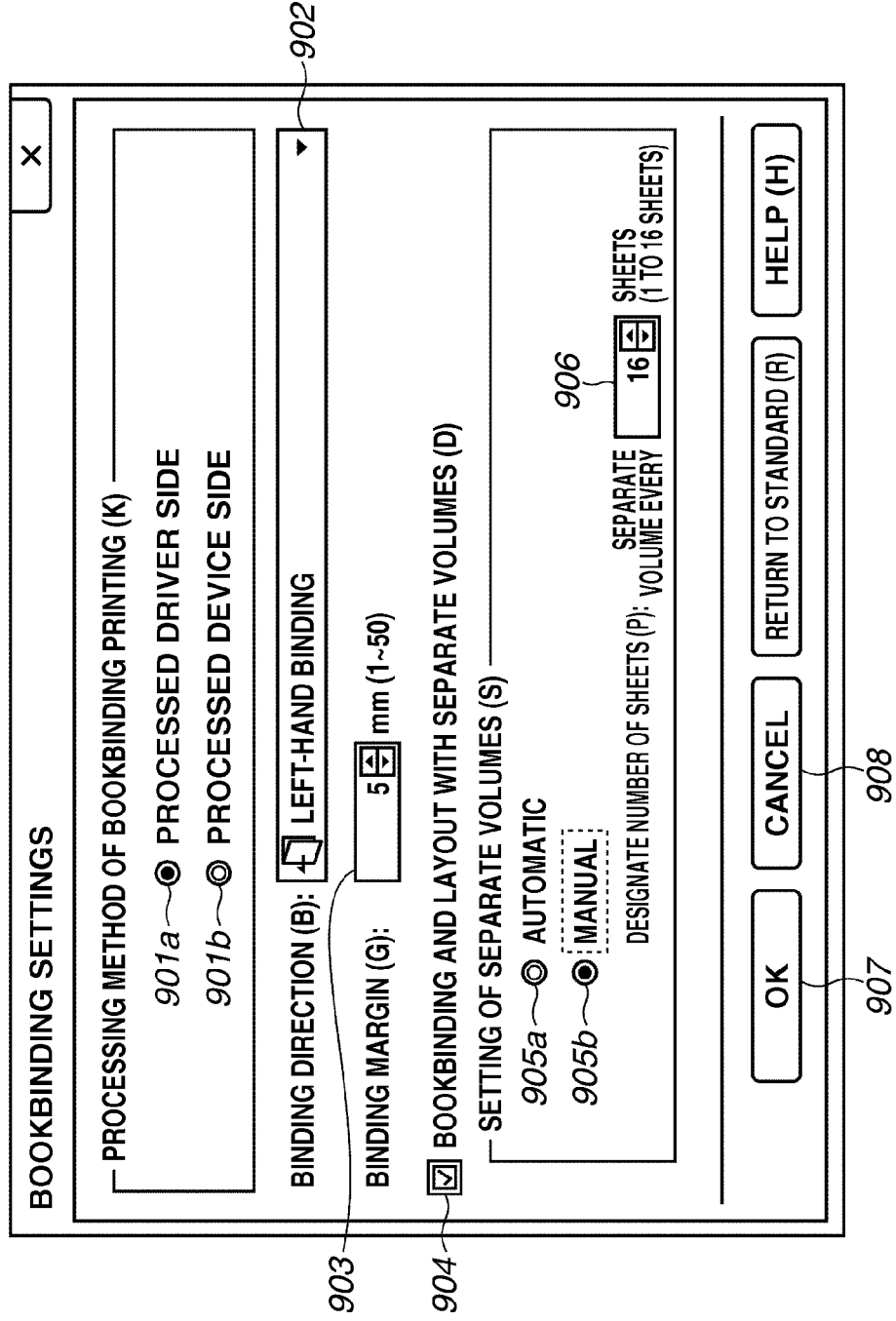
FIG. 9 illustrates a bookbinding setting screen.

FIG. 9 illustrates an example of the bookbinding setting screen. If the user impositions the logical pages using the printer driver 203, the user selects a radio button 901a of a bookbinding setting screen 900. If the user impositions the logical pages using the device (the printer 150), the user selects a radio button 901b.

Furthermore, the user sets binding direction in a pull-down menu 902 for binding direction, and sets binding margin in a pull-down menu 903 for binding margin. Further, the user turns on a check box 904 for bookbinding with separate volumes, the user can perform bookbinding with separate volumes.

If the number of printed sheets is more than an upper limit of number of sheets of center binding, bookbinding cannot be performed. Therefore, dividing into a plurality of booklets with a fewer number of sheets than the upper limit of number of sheets of center binding, and combining these booklets can form one booklet.

When a radio button 905a for automatic separate binding is set to ON, bookbinding is performed for each upper limit of each number of sheets of center binding of the printer 150. When a radio button 905b for manual separate binding is set to ON, bookbinding is performed for each number of sheets designated by the user using the number of sheets designation pane 906.

FIG. 10 is a diagram illustrating an example of an imposition method in a case where print setting is left side binding bookbinding. In the case where the print setting is to perform left side binding bookbinding, the two-sided printing and center binding and twofold are performed, by subjecting the logical pages to the bookbinding imposition.

When an OK button 907 is pressed by the user on the bookbinding setting screen 900, the layout unit 302 confirms the setting performed for the bookbinding setting screen 900, and closes the bookbinding setting screen 900. When a cancel button 908 is pressed by the user, the layout unit 302 makes the setting performed for the bookbinding setting screen 900 invalid, and closes the bookbinding setting screen 900.

Figure 8:
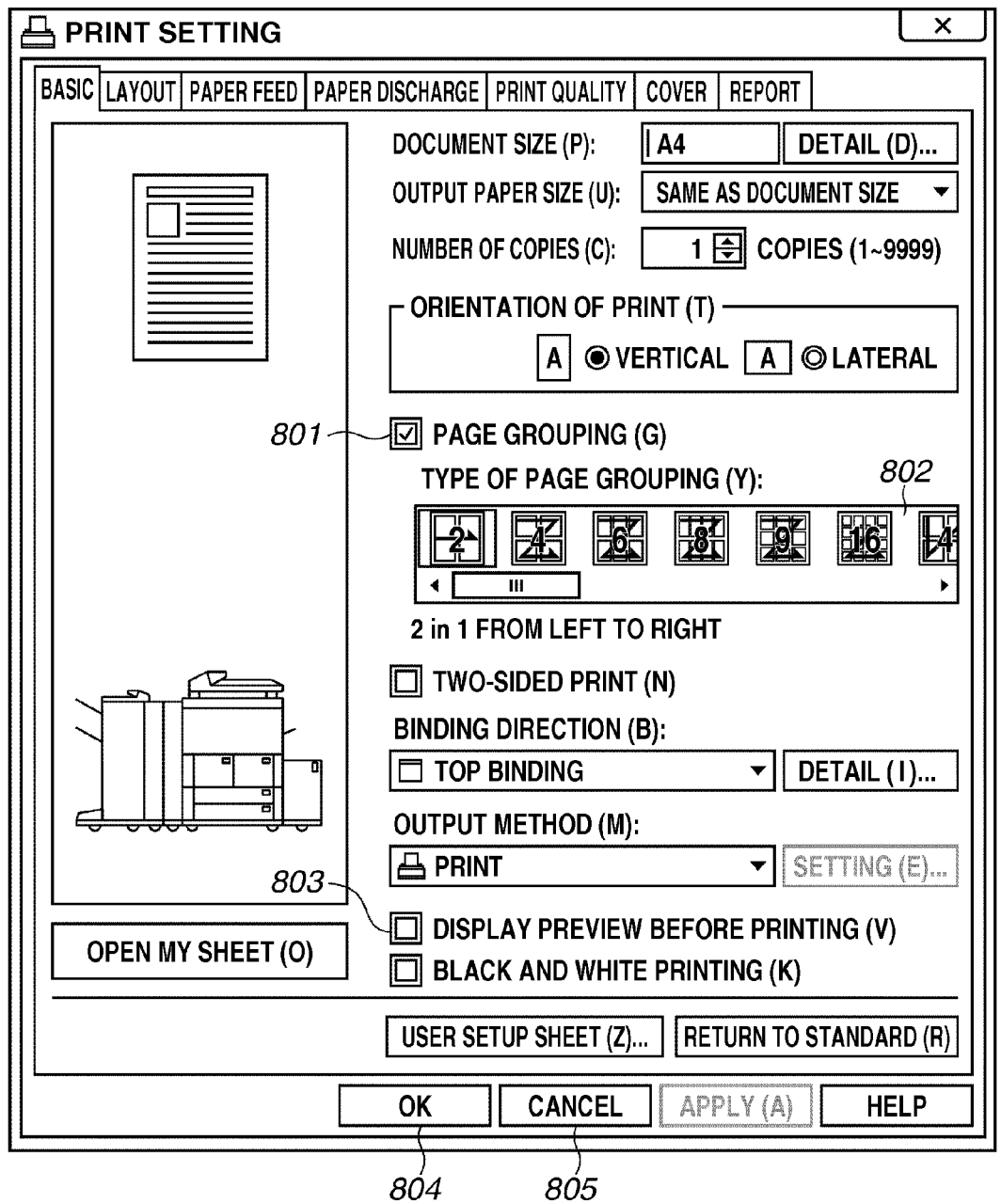
FIG. 8 illustrates a basic print setting screen.

FIG. 8 illustrates an example of a basic print setting screen of the printer driver 203. In the basic print setting screen 800, when the user turns on a check box 801 for page grouping, a selection pane 802 for type of page grouping becomes valid. The user selects in the selection pane 802 for type of page grouping, a number of the logical pages to be impositioned on one physical page, and an imposition order of the logical pages.

When an OK button 804 is pressed by the user on a basic print setting screen 800, the page division unit 301 confirms the setting performed for the basic print setting screen 800, and closes the basic print setting screen 800. When a cancel button 805 is pressed by the user, the page division unit 301 makes the setting performed for the basic print setting screen 800 invalid, and closes the basic print setting screen 800.

Figure 11:
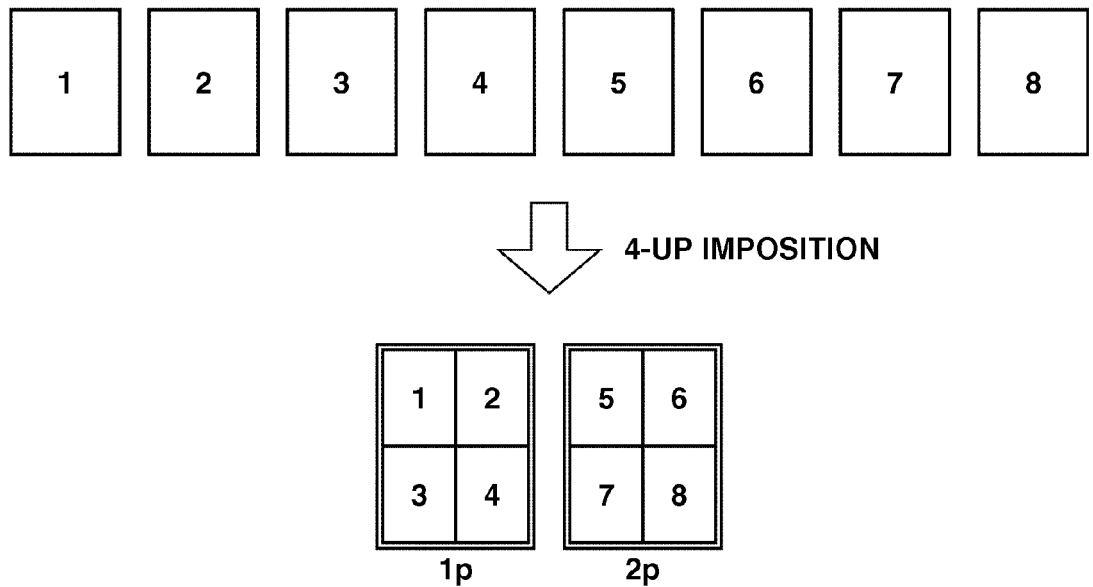
FIG. 11 is a diagram illustrating an imposition method in a case of right direction arrangement in 4-up imposition.

FIG. 11 is a diagram illustrating an example of an imposition method in a case where the print setting is 4-up imposition and right side direction arrangement. In a case where 4-up is executed, four logical pages are reduced, and the reduced logical pages are arranged in order on one physical page.

Further, the user can select a stamp name with a pull-down menu 606 for stamp name by turning on a check box 605 for stamp on the layout-related print setting screen 600.

Further, the user can select a type of page frame via a pull-down menu 608 for type of page frame, by turning on a check box 607 for page frame. When a stamp name and a type of page frame are selected in this manner, renderings of the stamp and the page frame can be added to the logical pages.

A rendering unit 303 converts XPS data which the layout unit 302 has generated into a control command which the printer 150 can recognize, and sends out it to the system spooler 204.

When a setting to have a preview before printing is performed in the print output attribute 307, the page division unit 301 activates a preview unit 304. When the user turns on a radio button 803 for preview before printing on the basic print setting screen 800, a setting to have a preview before printing is performed by the print output attribute 307. The preview unit 304 has therein a layout unit 305 for preview, processes the XPS data similar to the layout unit 302 and displays it on the display 10.

Figure 12:
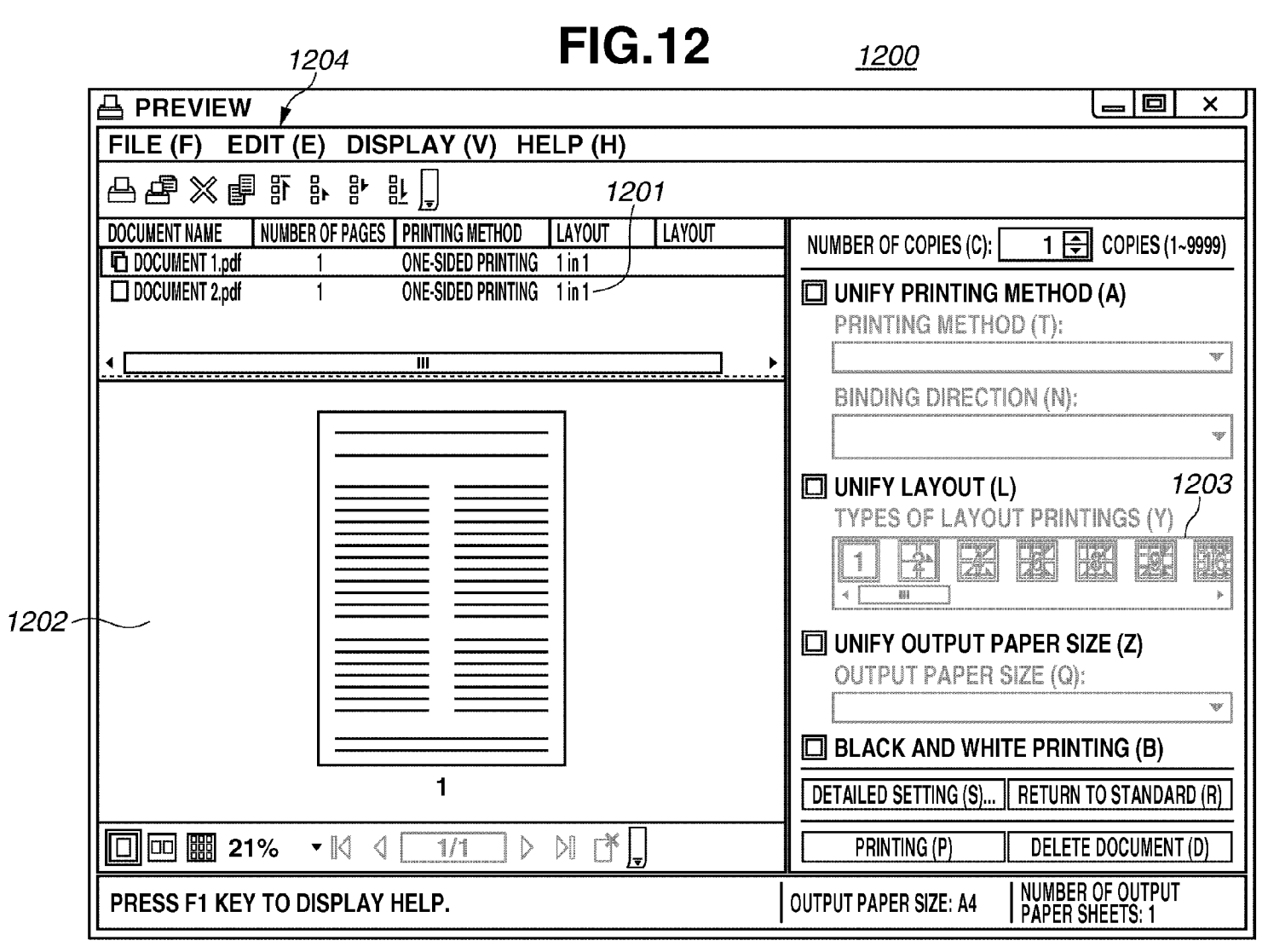

FIG. 12 illustrates an example of a preview screen. On a document list 1201 of a preview screen 1200, a list of printed documents is displayed, when the radio button 803 for preview before printing is turned on. On a preview pane 1202 is displayed a preview image of the document selected by the user from the list displayed on the document list 1201.

Furthermore, when the user operates an edit pane 1203 or an edit menu 1204, the layout unit 305 for preview can change the print output attribute 307 of the XPS data of the document selected by the document list 1201.

Further, the user selects a plurality of documents in the document list 1201, and executes a combination command by the edit pane 1203 or the edit menu 1204, the preview unit 304 can combine a plurality of pieces of XPS data into one piece of XPS data. The XPS data which the preview unit 304 has processed can be printed by being populated into the graphic engine 202.

Figure 13:
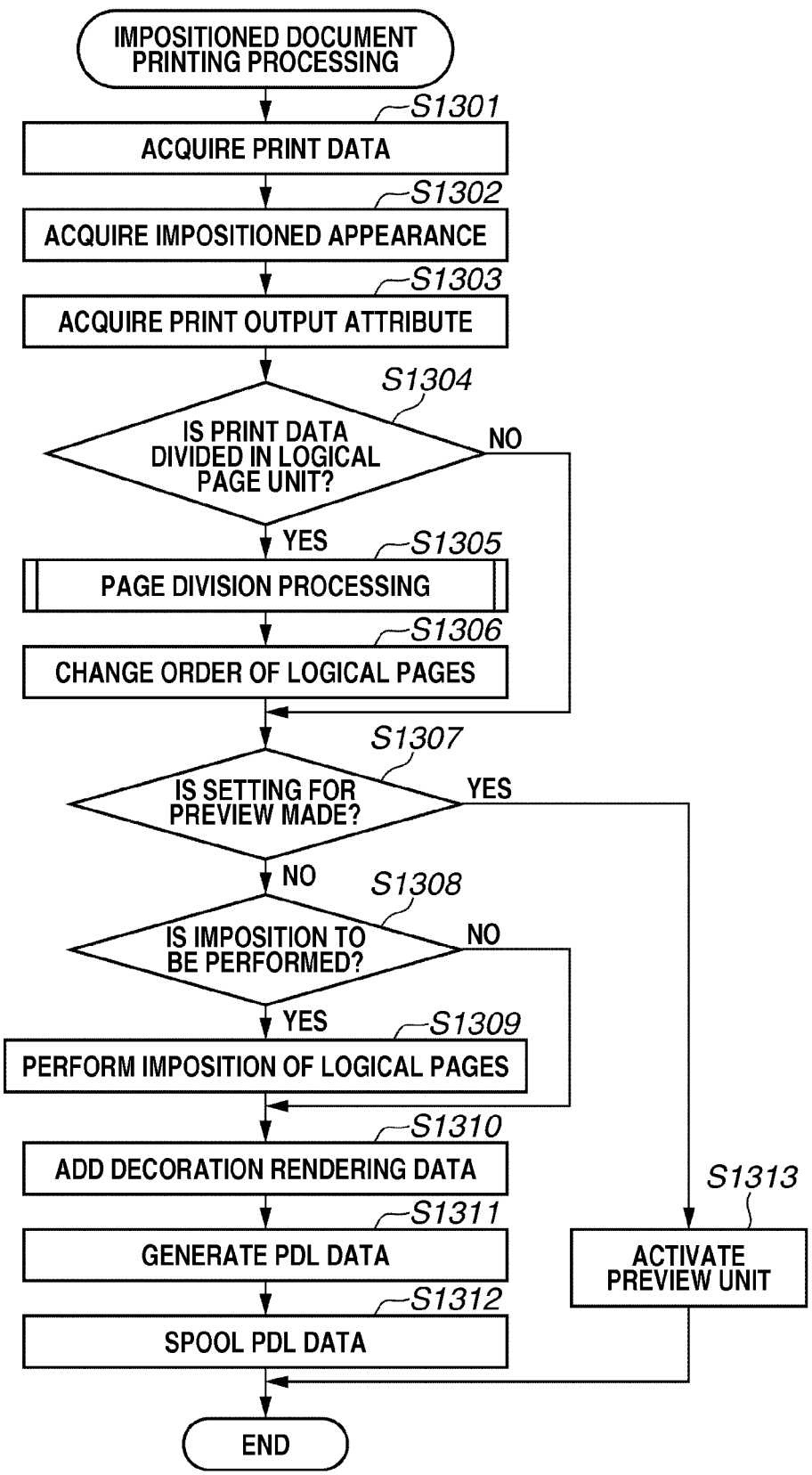
FIG. 13 is a flowchart illustrating impositioned document print processing.

FIG. 13 is a flowchart illustrating an example of impositioned document print processing by the printer driver 203.

First, in step S1301, the page division unit 301 acquires print data (XPS data). Next, insteps S1302 and S1303, the page division unit 301 acquires the impositioned appearance 306 and the print output attribute 307 included in the PT which the XPS data has therein.

Next, in step S1304, the page division unit 301 determines whether it is necessary to divide the XPS data in logical-page unit based on values (contents) of the impositioned appearance 306 and the print output attribute 307. The case where the XPS data needs to be divided in logical-page unit corresponds to, for example, at least one of the following (1) to (4).
(1) Where setting to have a preview before printing has been performed in the print output attribute 307.
(2) Where setting of page decoration such as addition of stamp or page frame has been performed in the print output attribute 307.
(3) Where the impositioned appearance 306 is bookbinding imposition, and satisfies at least any one of the following (3-1) to (3-6).

(3-1) Setting of bookbinding printing has not been performed in the print output attribute 307.
(3-2) Setting of binding direction of the impositioned appearance 306 is different from setting in the print output attribute 307.
(3-3) Bookbinding printing which is set in the print output attribute 307 is device bookbinding.
(3-4) Detailed setting of bookbinding printing which is set in the print output attribute 307 is separate binding printing.
(3-5) Binding margin of bookbinding printing which is set in the print output attribute 307 is not zero.
(3-6) Setting to add page number or page frame has been performed, in the print output attribute 307.
(4) Where the impositioned appearance 306 is N-up imposition of 2-up or more, and satisfies at least any one of the following (4-1) to (4-3).
(4-1) N-up imposition of 2-up or more is not set in the print output attribute 307.
(4-2) The impositioned appearance 306 is 2-up, and N of N-up imposition which is set in the print output attribute 307 is odd number.
(4-3) The impositioned appearance 306 is 4-up or more, and N of N-up imposition which is set for the print output attribute 307 is not the same as a value of the impositioned appearance 306.

As a result of the determination in step S1304, if it is necessary to divide the XPS data in logical-page unit (YES in step S1304), in step S1305, the page division unit 301 performs page division processing for dividing respective pages of the XPS data in logical-page unit.

Next, in step S1306, the page division unit 301 performs logical page order change processing for changing an order of the divided logical pages to the proper order. The page division processing in step S1305, and the logical page order change processing in step S1306 will be described in detail below.

On the other hand, as a result of the determination in step S1304, if it is not necessary to divide the XPS data inn logical-page unit (NO in step S1304), the processing in steps S1305 and S1306 are omitted, and the pages of the XPS data acquired in step S1301 are taken as logical pages as they are.

Next, in step S1307, the page division unit 301 determines whether the setting to have a preview before printing is performed for the print output attribute 307. If the setting to have a preview before printing has not been performed as a result of this determination (NO in step S1307), the page division unit 301 delivers the XPS data to the layout unit 302. On the other hand, the setting to have a preview before printing has been performed (YES in step S1307), in step S1313, the page division unit 301 activates the preview unit 304 and delivers the XPS data to the preview unit 304.

When the XPS data is delivered from the page division unit 301, in step S1308, the layout unit 302 determines whether N-up printing or bookbinding printing (whether to perform imposition) has been set for the print output attribute 307.

As a result of the determination, if N-up printing or bookbinding printing has been set the print output attribute 307 (YES in step S1308), in step S1309, the layout unit 302 performs N-up imposition or bookbinding imposition on the logical pages of the XPS data. Then, the processing proceeds to step S1310 described below.

On the other hand, if N-up printing or bookbinding printing has not been set in the print output attribute 307, and normal 1-up printing has been set for the print output attribute 307 (NO in step S1308), the processing in step S1309 is omitted and the processing proceeds to step S1310.

Then, in step S1310, the layout unit 302, if the setting of page number or page frame has been performed for the print output attribute 307, adds decoration rendering data corresponding to the setting to the XPS data. When processing of the XPS data by the layout unit 302 is completed, the layout unit 302 delivers the XPS data to the rendering unit 303.

In step S1311, the rendering unit 303 converts the XPS data into PDL data, and in step S1312, spools it in a system spooler 204. The system spooler 204 sends out the PDL data to the printer 150.

Figure 14:
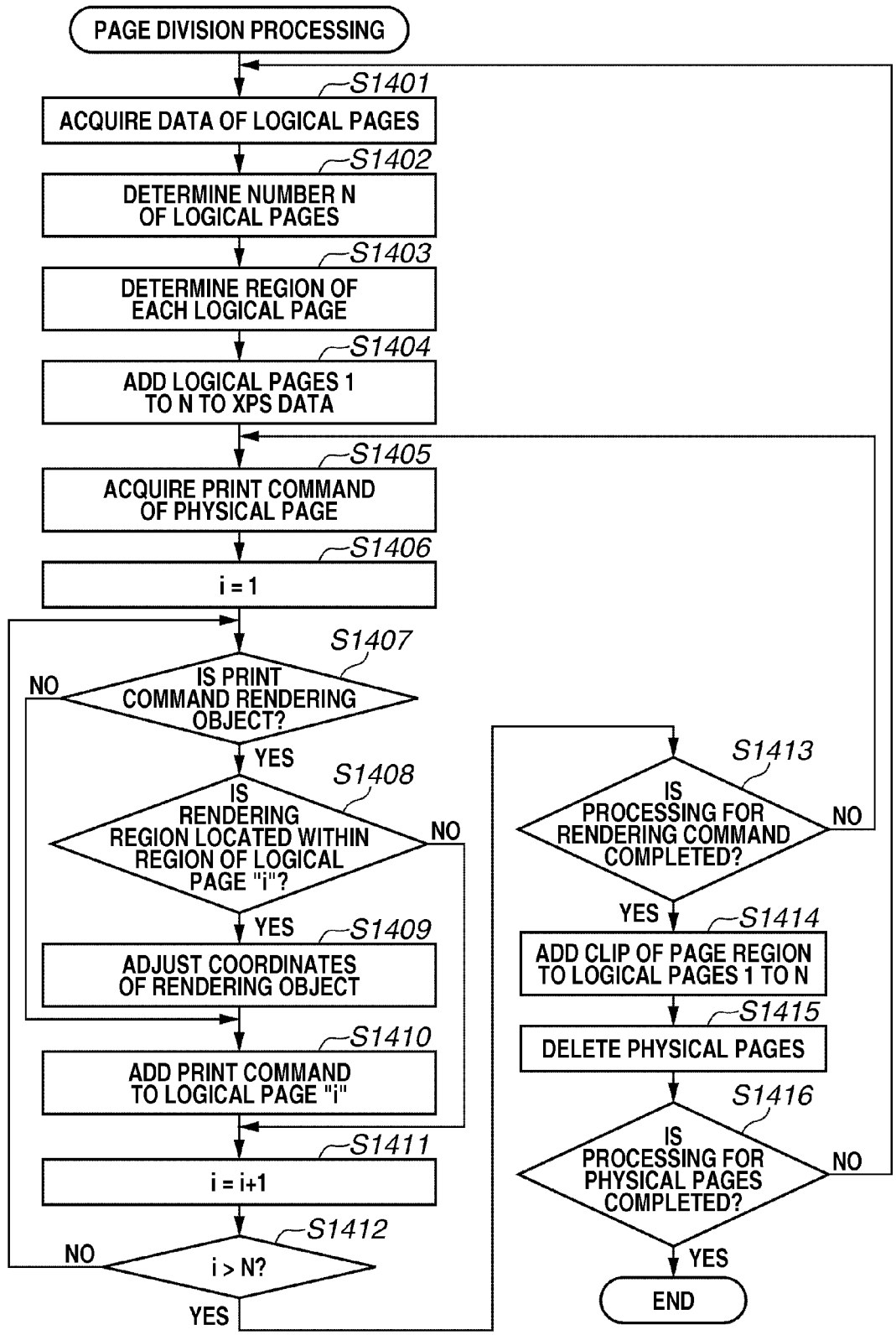
FIG. 14 is a flowchart illustrating details of processing in step S1305.
Figure 15:
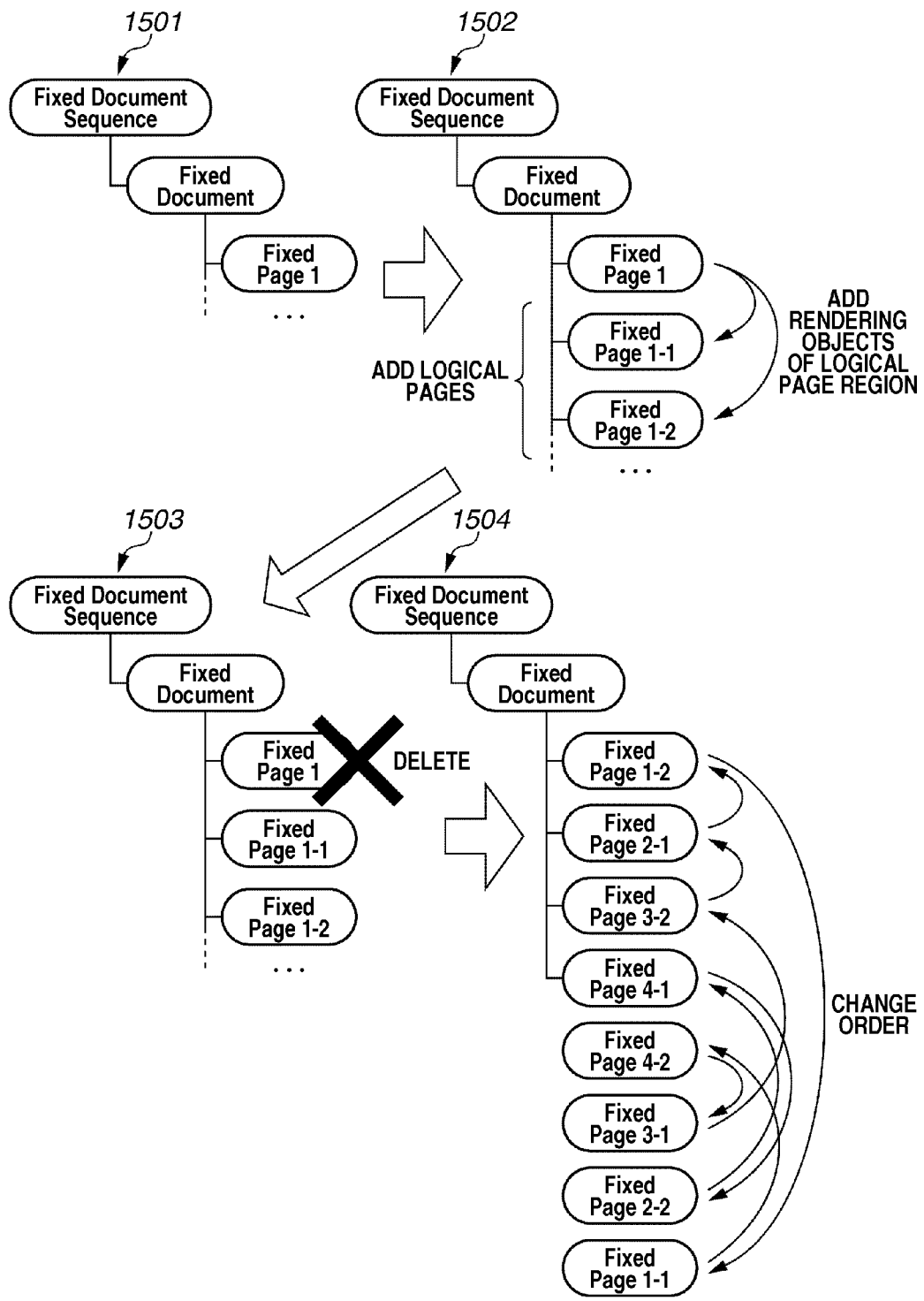
FIG. 15 is a diagram conceptually illustrating XPS data processing.

FIG. 14 is a flowchart illustrating the details of page division processing in step S1305 in FIG. 13. Further, FIG. 15 is a diagram for conceptually explaining examples of page division processing in step S1305, and manipulation and processing of the XPS data in logical page order change processing in step S1306.

In FIG. 14, first, in step S1401, the page division unit 301 acquires data of one physical page of the XPS data. In the examples illustrated in FIG. 15, data of physical pages acquired in step S1401 is data 1501.

Next, in step S1402, the page division unit 301 determines a number N of logical pages (N is positive integer) included in one physical page, from the impositioned appearance 306. Next, in step S1403, the page division unit 301 determines a region for a physical page of respective logical pages 1 to N (a region of physical page where respective logical pages 1 to N are arranged) and stores in a work area of the RAM 2.

If the impositioned appearance 306 is bookbinding imposition, a number of logical pages N included in one physical page becomes 2. If N-up imposition, a number of logical pages N included in one physical page becomes a number of logical pages selected in the page layout selection pane 703.

Figure 16:
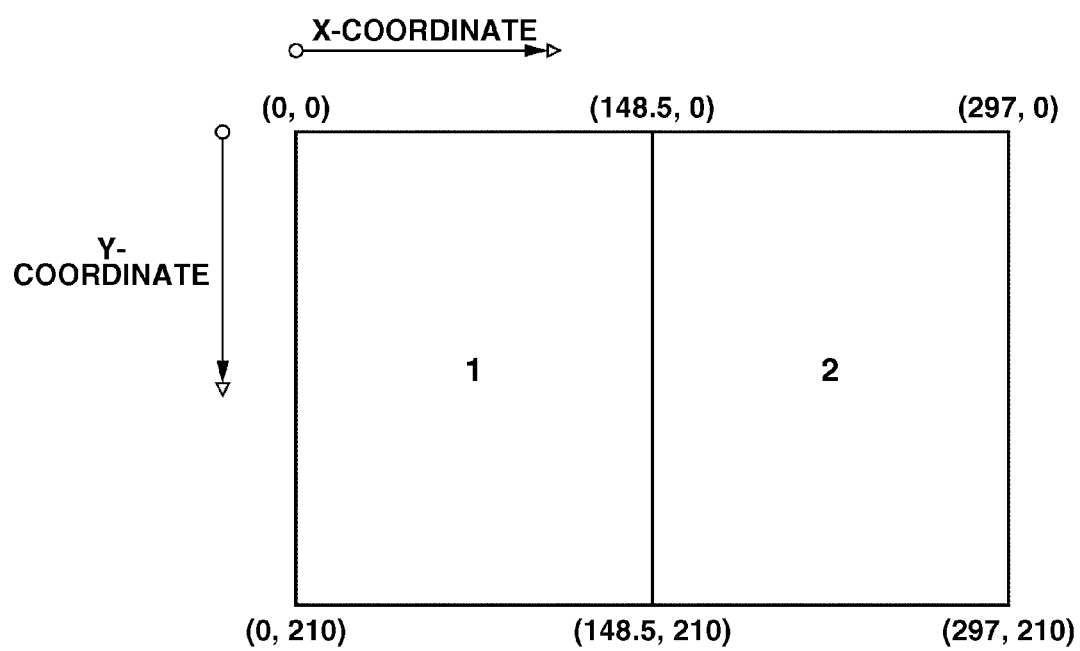
FIG. 16 is a diagram illustrating a region where logical pages are arranged, in a case where bookbinding imposition is performed.

FIG. 16 illustrates an example of a region where logical pages are arranged, in a case where bookbinding imposition is performed on A4 size sheet (a number of logical pages N is 2). A region of a logical 1 is a rectangular region defined by coordinates (0, 0)-(148.5, 210), and a region of a logical 2 is a rectangular region defined by coordinates (148.5, 0)-(297, 210).

Returning to descriptions of FIG. 14, in step S1404, the page division unit 301 adds the logical pages 1 to N corresponding to respective physical pages to the XPS data. At this time point, rendering objects of the logical pages added to the XPS data are empty, after this, the page division unit 301 copies and adds respective printing commands of the physical pages to the logical pages which are related to the physical pages.

Next, in step S1405, the page division unit 301 acquires a print command of physical page. In the XPS data, the print commands are classified into rendering objects (Path, Glyphs, Canvas) and other elements (e.g., resource or PT). Then, the page division unit 301 performs the processing in step S1406 to S1412 as below, with respect to variables for identifying logical pages i=1 to N. First, the page division unit 301 sets variable i for identifying logical pages to "1".

Next, in step S1407, the page division unit 301 determines whether a print command of a physical page is rendering object. As a result of the determination, if the print command of physical page is the rendering object (YES in step S1407), in step S1408, the page division unit 301 determines whether a rendering region of the rendering object is included in a region of logical page i even if only slightly.

As a result of the determination, if the rendering region of the rendering object is included in the region of the logical page i even if only slightly (YES in step S1407), the page division unit 301 copies the rendering object on the logical page i. At this time, in step S1409, the page division unit 301 turns respective coordinates of the rendering object into relative coordinates from an origin of the logical pages i, and adjusts coordinates of the rendering object.

Then, in step S1410, the page division unit 301 adds the rendering object to the logical page i. For example, in FIG. 16, if a rectangle defined by coordinates (180,140)-(280,190) is included in the logical 2, a left top coordinate of this rectangle is taken as (31.5,190) by subtracting coordinate (148,5,0) of an origin (left top point) of the logical pages 2.

On the other hand, as a result of the determination in step S1407, if the print command of the physical page is other than the rendering object (NO in step S1407), steps S1408 and S1409 are omitted and the processing proceeds to step S1410. In step S1410, the page division unit 301 copies and adds the print command on and to the logical page i.

In the examples illustrated in FIG. 15, the logical pages 1 to N are added to the physical page in step S1404, and data after the print command has been added to a logical page which is related to the print command in step S1410 is data 1502.

Then, in step S1411, the page division unit 301 adds "1" to a variable i for identifying logical page. Next, the page division unit 301 determines whether the variable i for identifying logical page has exceeded N (whether has satisfied i>N).

As a result of the determination, if the variable i for identifying logical page has not exceeded N (NO in step S1412), the processing returns to step S1407, and the processing in steps S1407 to S1412 are repeatedly performed until the variable i for identifying logical page exceeds N.

If the variable i for identifying logical page has exceeded N (YES in step S1412), in step S1413, the page division unit 301 determines whether the processing in accordance with the rendering command of the physical page is completed.

As a result of the determination, if the processing in accordance with the rendering command of the physical page is not completed (NO in step S1413), the processing returns to step S1405, and the processing in steps S1405 to S1413 are repeatedly performed until the processing in accordance with the rendering command of the physical page is completed.

Through the processing in the above steps S1405 to S1413, a rendering object positioned across the regions of a plurality of logical pages is added to the plurality of logical pages, and thus error of rendering omission or overlap is eliminated. However, if done so, the rendering object will be positioned outside the page regions of the logical pages.

For this reason, in step S1414, the page division unit 301 adds a clip object to the page regions of respective logical pages 1 to N. In the XPS data, it is only necessary to add a Path affixed with a clip attribute of a size of the page region.

Accordingly, in the logical page, at a page region where a portion of the rendering object is arranged, a portion of the rendering object is displayed, and the remaining portion of the rendering object can be prevented from being displayed. When creation of the logical pages 1 to N is completed in the above manner, in step S1415, the page division unit 301 deletes the original physical page.

In the examples illustrated in FIG. 15, data obtained after deleting the original physical page in step S1415 is data 1503. Accordingly, the XPS data is divided in logical-page unit from 1 to N.

Next, in step S1416, the page division unit 301 determines whether the processing with respect to all physical pages is completed. As a result of the determination, if the processing with respect to all physical pages is not completed (NO in step S1416), the process returns to step S1401, and the processing with respect to the next physical page is executed. The processing in step S1401 to S1416 are repeatedly performed until the processing with respect to all physical pages is completed.

In logical page order change processing in step S1306 in FIG. 13, a logical order of the logical pages divided in step S1305 is obtained from the impositioned appearance 306. In a case of bookbinding imposition of, for example, a number of the physical pages N (N is even number), a left side logical page of the physical page i is assumed to be i-1, and a right side logical page i-2. To arrange left side binding bookbinding impositioned data in the order of the logical pages, it is only necessary rearrange the order of the logical pages in the following order.

1-2, 2-1, - - - (N-1)-2, N-1, N-2, (N-1)-1, - - - , 2-2, 1-1.

Further, to arrange right side binding bookbinding impositioned data in logical page order, it is only necessary to rearrange the logical pages in the following order.

1-1, 2-2, - - - , (N-1)-1, N-2, N-1, (N-1)-2, - - - , 2-1, 1-2

In the examples illustrated in FIG. 15, data obtained after changing the order of logical pages step S1306 becomes data 1504

In the present exemplary embodiment as described above, upon turning on at least one of the check box 602, and the radio button 701, the user sets impositioned appearance representing an arrangement of the logical pages in respective physical pages of the print data which has been impositioned by the application 201.

Further, when turning on at least one of the check boxes 601.605,607,801,803, the user sets print output attribute as an attribute involved in an output of the print data.

Then, if the printer driver 203 satisfies division condition (refer to the above-described (1) to (4)) in which at least one of the impositioned appearance, and the print output attribute has been set in advance, divides the impositioned print data in logical-page unit. At this time, the printer driver 203 compares the impositioned appearance with the print output attribute, according to the condition.

Then, the printer driver 203 rearranges the divided logical pages in the order based on the impositioned appearance. The system spooler 204 creates a control command which the printer 150 can recognize, based on the rearranged logical pages, and outputs it to the printer 150.

Therefore, processing speed does not become slow to much, or a size of data to be output to the printer 150 does not become large, and the printer driver 203 can print the impositioned document by using the full functions thereof.

In the present exemplary embodiment, in dividing the impositioned print data in logical-page unit, if the rendering region of the rendering object which is present in the physical page is included in the page region of the logical page even if only slightly, the physical data is added to the logical page.

Then, the clipping region of the rendering object for the page region is added to the logical page. Therefore, even if the rendering object which lies across the logical pages is present, the rendering object can be prevented from being missed, and the rendering object can be prevented from overflowing into other logical pages or the like.

The above-described exemplary embodiments each only illustrate examples for materialization in implementing the present invention, and it is to be understood that technological scope of the present invention is not interpreted in a limited way by these. That is, the present invention can be implemented in various forms without departing from technological thought, or the main features thereof.

According to embodiments of the present invention, if at least any one of the impositioned appearance and the print output attribute satisfies the division condition, the impositioned print data is divided in logical-page unit, and the divided logical pages are rearranged, based on the impositioned appearance order.

Therefore, the impositioned print data, if needed, can be divided and rearranged in logical-page unit by the printer driver. Hence, printing of the impositioned print data can be appropriately performed by using the printer driver.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention. In an example, a computer-readable medium may store a program that causes a print control apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-259409 filed Nov. 19, 2010, which is hereby incorporated by reference herein in its entirety.

What is claimed is:

1. A print control apparatus for processing print data impositioned by an application program by using a printer driver, the print control apparatus comprising:
    a determination unit configured to determine whether at least any one of an impositioned appearance indicating an arrangement of logical pages in respective physical pages of the impositioned print data, and a print output attribute, which is an attribute of an output of the impositioned print data, satisfies a division condition set in advance;
    a division unit configured to, in response to the determining unit determining that at least any one of the impositioned appearance and the print output attribute satisfies the division condition, divide the impositioned print data in logical-page unit; and
    a rearrangement unit configured to rearrange logical pages divided by the division unit in an order according to the impositioned appearance,
    wherein, in response to the determination unit determining that neither of the impositioned appearance and the print output attribute satisfies the division condition, the impositioned print data is prevented from being divided in logical-page unit.

2. The print control apparatus according to claim 1, wherein the division unit includes an addition unit configure to, in response to a rendering region of a rendering object being included in a page region of a logical page, add the rendering object to a logical page that is present in a physical page of the impositioned print data, and an addition unit configured to add a clipping region of a page region of the logical page to the logical page.

3. The print control apparatus according to claim 1, wherein the determination unit determines whether the impositioned appearance and the print output attribute satisfy the division condition, based on a result of comparison made between the impositioned appearance and the print output attribute.

4. The print control apparatus according to claim 1, further comprising:
    a processing unit configured to process the logical pages rearranged by the rearrangement unit, based on the print output attribute.

5. A print control method for processing print data impositioned by an application program by using a printer driver, the print control method comprising:
    determining whether at least any one of an impositioned appearance indicating an arrangement of logical pages in respective physical pages of the impositioned print data, and a print output attribute, which is an attribute of an output of the impositioned print data, satisfies a division condition set in advance;
    dividing, in response to it being determining that at least any one of the impositioned appearance and the print output attribute satisfies the division condition, the impositioned print data in logical-page unit; and
    rearranging divided logical pages in an order according to the impositioned appearance,
    wherein, in response to it being determining that neither of the impositioned appearance and the print output attribute satisfies the division condition, the impositioned print data is prevented from being divided in logical-page unit.

6. The print control method according to claim 5, wherein dividing further includes
    adding, in response to a rendering region of a rendering object being included in a page region of a logical page, the rendering object to a logical page that is present in a physical page of the impositioned print data, and
    adding a clipping region of a page region of the logical page to the logical page.

7. The print control method according to claim 5, wherein determining further includes determining whether the impositioned appearance and the print output attribute satisfy the division condition, based on a result of comparison made between the impositioned appearance and the print output attribute.

8. The print control method according to claim 5, further comprising:
    processing the rearranged logical pages, based on the print output attribute.

9. A non-transitory storage medium storing a program that causes an information processing apparatus that processes print data impositioned by an application program by using a printer driver to perform a print control method, the print control method comprising:
    determining whether at least any one of an impositioned appearance indicating an arrangement of logical pages in respective physical pages of the impositioned print data, and a print output attribute, which is an attribute of an output of the impositioned print data, satisfies a division condition set in advance;
    dividing, in response to it being determining that at least any one of the impositioned appearance and the print output attribute satisfies the division condition, the impositioned print data in logical-page unit; and
    rearranging divided logical pages in an order according to the impositioned appearance,
    wherein, in response to it being determining that neither of the impositioned appearance and the print output attribute satisfies the division condition, the impositioned print data is prevented from being divided in logical-page unit.

\* \* \* \* \*